(No Model.)

W. A. CONNER.
ELECTRIC CABLE.

No. 395,546. Patented Jan. 1, 1889.

WITNESSES:
L. C. McCutcheon
F. E. Gaither

INVENTOR,
William A. Conner
by Darwin S. Wolcott
Att'y.

UNITED STATES PATENT OFFICE.

WILLIAM A. CONNER, OF PITTSBURG, PENNSYLVANIA.

ELECTRIC CABLE.

SPECIFICATION forming part of Letters Patent No. 395,546, dated January 1, 1889.

Application filed July 30, 1888. Serial No. 281,384. (No model.)

*To all whom it may concern:*

Be it known that I, WILLIAM A. CONNER, a citizen of the United States, residing at Pittsburg, in the county of Allegheny and State of Pennsylvania, have invented or discovered a certain new and useful Improvement in Electric Cables, of which improvement the following is a specification.

The invention described herein relates to certain improvements in lead-covered electric cables. It has been ascertained that the lead covering, when the cable is buried without a protective covering, becomes oxidized and is in time destroyed. When lead-covered cable is suspended, as in aerial lines, the softness of the lead permits of the hangers, which are frequently only single wire loop, to cut into the lead covering and come into contact with the electric conductors. It has been attempted to overcome the above objections by adding a small percentage of tin, antimony, and other substances to the lead, thereby forming an alloy which shall be free from the above objections; but as the percentage of tin, antimony, or other substances must be small to prevent the production of an alloy so brittle as to be inapplicable, great difficulty is experienced in thoroughly mixing the materials; hence parts of the cable-covering will be nearly pure lead, and therefore open to objections above recited.

The object of my invention is to provide a metallic covering for the lead capable of resisting the oxidizing action of acids and alkalies when the cable is buried in the earth, or when the cable is to be employed in aerial lines the metallic covering shall be sufficiently hard to resist the cutting action of the hangers.

In general terms, the invention consists in a cable constructed substantially as hereinafter more fully described and claimed.

Figure 1:
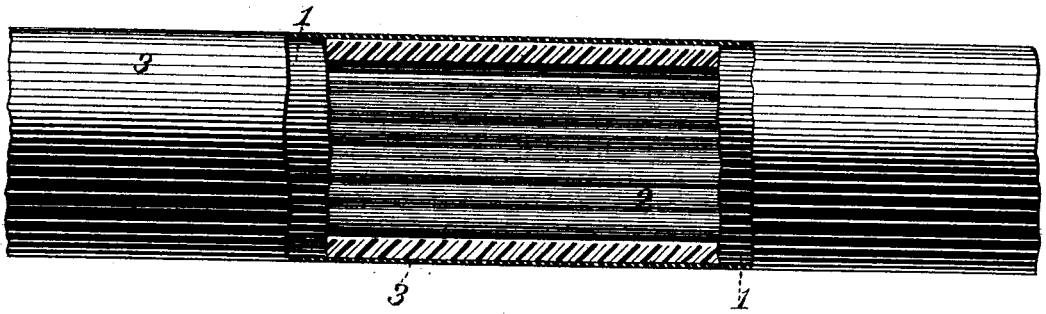
Figure 2:
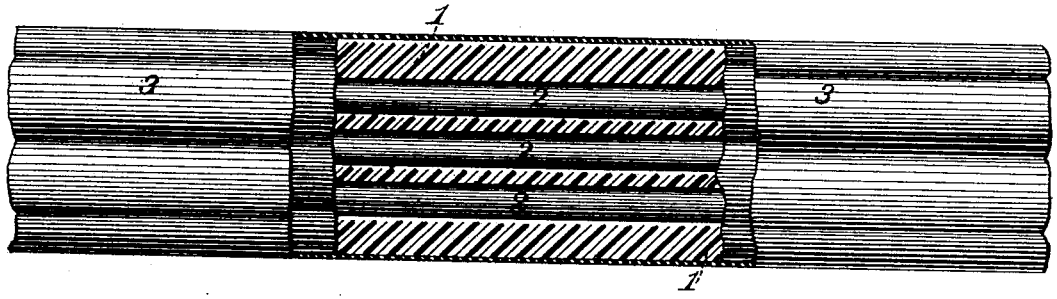

In the accompanying drawings, forming a part of this specification, Figure 1 is a view, partly in section and partly in elevation, of a "bunched" lead-covered cable having my improved coat or cover applied thereto; and Fig. 2 is a similar view of an "anti-induction" cable having my invention applied thereto.

In the practice of my invention the cable 1, which may be either of the anti-induction type—*i. e.*, each conductor either partially or wholly surrounded with lead—or of the bunched type—*i. e.*, a number of conductors inclosed in a lead pipe—is formed in the usual or any suitable manner—as, for example, by pressing the lead around the insulated conductors 2 in a suitable press. The metallic coating 3 is then applied to the surface of the lead covering by passing the cable through a bath of the molten metal of which the coating is to be formed, a suitable flux being first applied to the surface of the cable, in order that the molten metal may adhere firmly to the cable. This method of applying the coat is especially applicable to the covering of old cable—*i. e.*, cable in stock. In manufacturing new cable, however, a comparatively thin ring of the coating metal is placed in the cylinder of the press and the lead for the covering placed inside of said ring, so that in forming the cable both metals will be forced out and around the insulated conductors, as is now practiced in the manufacture of lead-covered cable. This thickness of the ring of coating material placed in the cylinder of the press should be proportioned to the thickness of the coating or surfacing desired on the finished cable.

It will be readily understood that cables designed to be placed under ground require a metallic coating or surfacing capable of resisting oxidizing or other destructive agencies, but are not required to be especially hard, as is the case when the cables are to be employed for aerial lines, in order that they may resist the cutting action of the hangers. As tin possesses in quite a high degree the qualities desired in both underground and aerial cables, I prefer to employ tin, or an alloy thereof, in forming the coating or surfacing, but do not wish to be understood as limiting myself to the use of tin or its alloys, as other metals or their alloys can be employed with good results. As only a very thin coating or surfacing is necessary to protect the lead-covered cable, a much smaller quantity of tin than that required in forming an alloy with lead, as above stated, need be used, with the added advantage of applying the coating or surface to the place where it is required and nowhere else.

I claim herein as my invention—

1. In an electric cable, the combination of one or more insulated electric conductors, a lead covering surrounding the conductor or conductors, and a coating or surfacing formed of a metal more durable than the lead and covering the same, substantially as set forth.

2. In an electric cable, the combination of one or more insulated electric conductors, a lead covering surrounding the conductor or conductors, and a coating or surfacing of tin or alloy thereof for the lead covering, substantially as set forth.

In testimony whereof I have hereunto set my hand.

WILLIAM A. CONNER.

Witnesses:
W. B. CORWIN,
DARWIN S. WOLCOTT.